(12) United States Patent
Yu et al.

(10) Patent No.: US 10,820,579 B2
(45) Date of Patent: Nov. 3, 2020

(54) WATER QUALITY PURIFICATION DEVICE, WATER PURIFIER AND AQUARIUM USING THE SAME

(71) Applicant: GUANGDONG BOYU GROUP CO., LTD, Chaozhou (CN)

(72) Inventors: Youkai Yu, Chaozhou (CN); Bingyan Yu, Chaozhou (CN); Jianqin Yu, Chaozhou (CN)

(73) Assignee: GUANGDONG BOYU GROUP CO., LTD, Chaozhou (CN)

(*) Notice: Subject to any disclaimer, the term of this patent is extended or adjusted under 35 U.S.C. 154(b) by 0 days.

(21) Appl. No.: 16/247,759

(22) Filed: Jan. 15, 2019

(65) Prior Publication Data
US 2019/0387722 A1    Dec. 26, 2019

(30) Foreign Application Priority Data

Jun. 21, 2018    (CN) .................... 2018 2 0960747 U

(51) Int. Cl.
| | |
|---|---|
| *A01K 63/04* | (2006.01) |
| *C02F 1/461* | (2006.01) |
| *C02F 3/00* | (2006.01) |
| *C02F 3/30* | (2006.01) |

(52) U.S. Cl.
CPC ........ *A01K 63/045* (2013.01); *C02F 1/46109* (2013.01); *C02F 3/005* (2013.01); *C02F 3/30* (2013.01)

(58) Field of Classification Search
CPC ......... A01K 63/045; C02F 3/005; C02F 3/30; C02F 1/46109

USPC ...... 210/167.22, 259, 615, 616, 617, 748.01
See application file for complete search history.

(56) References Cited

U.S. PATENT DOCUMENTS

2017/0150701 A1*   6/2017   Gilmore .................. C02F 1/001

FOREIGN PATENT DOCUMENTS

| CN | 101665311 A | * | 3/2010 |
|---|---|---|---|
| CN | 103 553 224 A | | 2/2014 |
| CN | 103 553 282 A | | 2/2014 |
| CN | 106 554 072 A | | 4/2017 |

(Continued)

OTHER PUBLICATIONS

Machine-generated English translation of CN 101665311, translated on Oct. 21, 2019.*

(Continued)

*Primary Examiner* — Fred Prince
(74) *Attorney, Agent, or Firm* — McNees Wallace & Nurick LLC

(57) ABSTRACT

Provided are a water quality purification device, and a water purifier and an aquarium that use the water quality purification device. The water quality purification device includes a component filled with a micro-electrolysis catalyst and a biological filtration component that are connected in series. By utilizing a micro-electrolysis technology, pollutants in water are preprocessed and the biodegradability of the water is improved. A water body processed by the micro-electrolysis catalyst enters the biological filtration component, which can greatly improve the purification efficiency of the biological filter bed. Working together with an adsorption electrode, this structure can effectively stabilize the water quality in the aquarium and greatly reduce the required times of changing water.

11 Claims, 2 Drawing Sheets

(56) References Cited

FOREIGN PATENT DOCUMENTS

CN 108 793 390 A 11/2018
WO WO2005/049502 A * 6/2005

OTHER PUBLICATIONS

Machine-generated English translation of CN 104174440, translated on Oct. 21, 2019.*
Machine-generated English Translation of CN 106554072 A, generated on Mar. 17, 2020.*
Extended European Search Report issued to European counterpart Application No. 19178641.7 by the EPO dated Nov. 8, 2019.

* cited by examiner

WATER QUALITY PURIFICATION DEVICE, WATER PURIFIER AND AQUARIUM USING THE SAME

CROSS-REFERENCES TO RELATED APPLICATIONS

This application claims priority to a Chinese Patent Application No. 201820960747.5, filed Jun. 21, 2018, disclosure of which is incorporated herein by reference in its entirety.

TECHNICAL FIELD

The present disclosure relates to the technical field of water quality purification, and more particularly relates to a water quality purification device, and a water purifier and an aquarium that employ the water quality purification device.

BACKGROUND

Aquarium cultivation of seawater and/or freshwater organisms has higher requirements on the water quality in the aquarium, especially on specifications such as cleanliness, pH value, ammonia nitrogen, and total phosphorus. Meanwhile, the ecological environment in the aquarium is simple, and so has a weak capability in terms of removal of cumulative pollutants such as food residues and organism excretions that enter the water body, resulting in a large fluctuation of water quality in the aquarium. Consequently, the aquarium is susceptible to problems such as algae outbreak, aquarium turbidity, and death of aquarium organisms.

Therefore, additional measures are necessary, such as regular replacement of the water in the aquarium or employment of additional cleaning equipment to remove the pollutants in the water body. Frequently replacement of the water in the aquarium, however, is labor-intensive, and too many water changes can easily lead to discomfort of the aquarium organisms. Current purification equipment uses physical or biological filtration as the primary means. Among them, physical filtration can only remove particles and residues in the water, but cannot remove small molecules such as ammonia nitrogen and phosphates that have entered the water. While biological filtration can purify small molecular substances, it has a low working efficiency, because the pollutants entering the water body are usually poor in biodegradability and difficult to be directly used by microorganisms.

For example, Chinese Patent Publication No. CN 103781730A discloses a device for purifying water in an aquarium, the device including an electrochemical flocculation reactor. The electrochemical flocculation reactor includes a titanium-based electrode which can convert ammoniacal nitrogen, nitrite and/or nitrate into nitrogen, and a carbon-based catalyst suitable for generating hydroxy groups. Although it discloses adding the carbon-based catalyst into the aquarium, activated carbon particles are used as the matrix of the carbon-based catalyst is and the carbon-based catalyst needs to be driven by an electrode in order to function. The use of the catalyst alone has problems of weak purification capability, incomplete purification and the like. Moreover, the structure of this device is complicated, the cost of the titanium-based electrode is high, and there is a risk of electricity leakage in the use of the aquarium.

SUMMARY

In view of the problems existing in the current aquarium purification technology, the present disclosure provides a water quality purification device, a water purifier and an aquarium that employ the water quality purification device. By utilizing a micro-electrolysis technology, pollutants in water are preprocessed and biodegradability of the water is improved. More particularly, a water body processed by the micro-electrolysis catalyst enters the biological filtration component, which can greatly improve purification efficiency of the biological filter bed. Working in conjunction with an adsorption electrode, this structure can effectively stabilize the water quality in the aquarium and greatly reduce the number of water changes.

To achieve this object, the present disclosure provides the solutions described below.

In a first aspect, the present disclosure provides a water quality purification device that includes a component filled with a micro-electrolysis catalyst, and a biological filtration component, which are sequentially connected in series.

The present disclosure can achieve rapid degradation and high-efficiency purification of pollutants that contaminate the water body in the aquarium by combining the micro-electrolysis catalyst with the biological filtration component.

The catalyst filled in the component filled with a micro-electrolysis catalyst in the present disclosure is an existing micro-electrolysis catalyst found in the related art, which may be an iron-carbon micro-electrolysis catalyst as well as an improved and optimized iron-carbon micro-electrolysis catalyst, such as described in Chinese Patent Publication Nos. CN 104607189A and CN 104174440A, but generally excludes heavy metal elements such as Cu and Zn that are toxic to aquarium organisms.

In the present disclosure, when the micro-electrolysis catalyst is used for purifying the water body, a micro-electrolysis current is generated by the galvanic effect, whereby hydroxyl groups may be generated, microelement ions are dissociated, nitrite, organic amine and organic sulfide are degraded, and phosphoric acid is converted into a precipitate. The hydroxyl-treated organic molecules are more easily utilized by denitrifying bacteria, thereby improving the denitrification efficiency.

However, the use of the component filled with the micro-electrolysis catalyst alone or the use of biological filtration alone for water purification cannot achieve the desired effect of removing pollutants and stabilize water quality.

If the single biological filtration is used to purify the polluted water body, the degradation process of the cumulative pollutants is as follows:

COD (Macromolecule)→BOD$_5$ (Micromolecule)  (The reaction is slow)

NH$_4^+$→NO$^{2-}$→NO$_3^-$  (The reaction is slow)

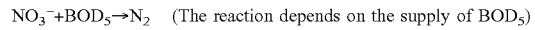
NO$_3^-$+BOD$_5$→N$_2$  (The reaction depends on the supply of BOD$_5$)

PO$_4^{3-}$→PPA  (The reaction is slow)

If the micro-electrolysis catalyst is used in combination with=biological filtration, the degradation process of the cumulative pollutants is as follows:

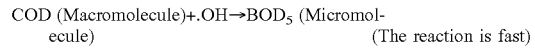
COD (Macromolecule)+.OH→BOD$_5$ (Micromolecule)  (The reaction is fast)

NH$_4^+$+.OH→NO$^{2-}$+.OH→NO$_3^-$  (The reaction is fast)

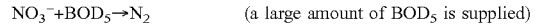
NO$_3^-$+BOD$_5$→N$_2$  (a large amount of BOD$_5$ is supplied)

PO$_4^{3-}$+M$^+$→MPO$_4$  (The reaction is fast)

If only the component filled with the micro-electrolysis catalyst is used to purify the water body, since the number of hydroxyl generated by the micro-electrolysis catalyst cannot completely degrade organic macromolecule pollutants in the water, meanwhile, the phosphates combine with positively charged ions released from the catalyst and form a precipitation, making the water body turbid, it is difficult to purify the water quality in the aquarium to be suitable for the survival of aquarium organisms. Meanwhile, after the ammoniacal nitrogen is converted into nitrate nitrogen, the nitrate nitrogen needs to be converted and then generates the nitrogen with the help of the denitrifying bacteria in biological filter bed. Furthermore, it can be seen that the micro-electrolysis catalyst needs to be combined with the biological filtration, and the decomposition rate of the pollutants in the aquarium can be effectively improved and the water quality in the aquarium can be maintained for a long period of time.

The purification ways of the water quality purification device described in the present disclosure includes:

the water body to be purified contacts the component filled with the micro-electrolysis catalyst, by the galvanic effect, the micro-electrolysis current is generated, the hydroxyl may be generated and the microelement ions are dissociated to purify the water quality, the purified water contacts the biological filtration component to be further processed, and the processed purified water is then returned for reuse.

Following is the typical solution of the present disclosure, and is not to be construed as limiting the solution provided by the present disclosure. Through the following solution, technical objects and beneficial effects of the present disclosure can be better achieved.

In the typical solution of the present disclosure, the component filled with the micro-electrolysis catalyst includes a container and the micro-electrolysis catalyst filled in the container.

In the typical solution of the present disclosure, the container is a support structure having openings and being operative to fix catalyst particles, which may be a filter plate, a filter screen, a filter material box, a sieve plate case or other reactor devices similar to a fixed bed. The material of the container is not particularly limited as long as the micro-electrolysis catalyst can be filled in.

In the typical solution of the present disclosure, there are an aerobic zone and an anaerobic zone which are interconnected in the biological filtration component. Typically, the water flow generally flows through the aerobic zone and then flows through the anaerobic zone to implement a function of an aerobic degradation plus anaerobic denitrification.

In the typical solution of the present disclosure, the biological filtration component includes any one selected from a group consisting of: a biochemical wheel, a biochemical cotton, a biochemical ball, a quartz ball, an activated carbon, and a ceramic packing, or a combination of at least two selected therefrom. The ceramic packing has microbial attachment ability. Typical but non-limiting examples of the combination are: a combination of the biochemical wheel and the biochemical cotton, a combination of the biochemical ball and the quartz ball, a combination of the quartz ball and the activated carbon, a combination of the activated carbon and the ceramic packing, a combination of the biochemical wheel, the biochemical cotton and the biochemical ball, a combination of the quartz ball, the activated carbon and the ceramic packing, and a combination of the biochemical cotton, the biochemical ball, the quartz ball, the activated carbon and the ceramic packing.

In the present disclosure, the biochemical wheel is the existing structure in the related art, such as the biochemical wheel used in the CN 2452286, which uses a porous material (such as a sponge, PP cotton) to make a cylindrical structure, the water flow lashes the biochemical wheel in a direction perpendicular to a long axis of a cylinder of biochemical wheel to rotate the biochemical wheel.

In the typical solution of the present disclosure, the water quality purification device further includes an electrolysis electrode. The electrolysis electrode is disposed at an upstream of the component filled with the micro-electrolysis catalyst. Here, the water before entering into the component filled with the micro-electrolysis catalyst is taken as the upstream, and the water flowing out of the component filled with the micro-electrolysis catalyst is taken as a downstream.

In the present disclosure, the electrolysis electrode is not necessarily used, and the electrolysis electrode may assist the microelectrolysis of the micro-electrolysis catalyst to further improve the water purification effect.

The material of the electrolysis electrode may be stainless steel and/or titanium alloy. To increase the electrode life or improve the electrolysis effect, any one of or at least two of $TiO_2$, $SnO_2$ or $RuO_2$ may be selectively added to the electrode surface as a mixed coating, a working voltage is 3 V~12V, a typical voltage is 5 V, an electrolysis current density is 0.1 mA/cm2~5 mA/cm2.

In the typical solution of the present disclosure, the water quality purification device further includes a transfer pump driving a circulation flow function of a water body. The transfer pump is disposed at a water flow path of the water quality purification device. For example, the transfer pump may be disposed between the component filled with the micro-electrolysis catalyst and the biological filtration component, and may also be disposed between the electrolysis electrode and the component filled with the micro-electrolysis catalyst.

In a second aspect, the present disclosure provides a water purifier used in an aquarium. The water purifier includes the water quality purification device described above.

The water purifier used in the aquarium described in the present disclosure, may depending on the design, uses a fully-submerged structure or a partially fully-submerged structure, or merely extracts water flow from or return the water flow to the aquarium. The whole water purifier is independent of the aquarium and may also be integrally formed with the aquarium.

In the typical solution of the present disclosure, the water purifier further includes a transfer pump serving a function of driving the circulation of a water body. The transfer pump is disposed at an upstream and/or a downstream of a water flow path of the water quality purification device. Here, a water inlet end is taken as the upstream of the water quality purification device, and a water outlet end is taken as the downstream of the water quality purification device.

In a third aspect, the present disclosure provides an aquarium. The aquarium includes the water quality purification device described above.

Compared with the related art, the water quality purification device described in the present disclosure has the following beneficial effects:

The present disclosure enables rapid degradation and high-efficiency purification of pollutants in the polluted water body by combining the micro-electrolysis catalyst with the biological filtration component, so that various indicators of the water quality meet the cultivation standards for freshwater/seawater fish and molluscs.

1: Sieve Plate; 2: a Biochemical Wheel; 3: Water Pump; 4: Electrolysis Electrode.

DETAILED DESCRIPTION

To better illustrate the present disclosure and solutions of the present disclosure, the present disclosure will be described in further detail. Following embodiments are merely simple examples of the present disclosure, and are not intend to represent or limit the scope of protection of the present disclosure, which is subject to the appended claims.

The part of detailed description of the present disclosure provides a water quality purification device, and a water purifier and an aquarium that employ the water quality purification device. The water quality purification device includes a component filled with a micro-electrolysis catalyst and a biological filtration component which are connected in series.

The following are typical but non-limiting embodiments of the present disclosure.

Embodiment One

Figure 1:
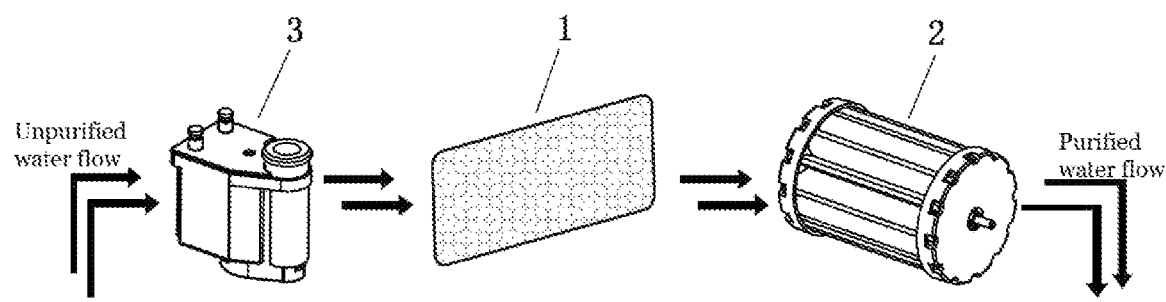
FIG. 1 is a schematic diagram of a water purifier in Embodiment one in accordance with the present disclosure.

This embodiment provides a water purifier. As illustrated in FIG. 1, the water purifier includes a water quality purification device and a water pump 3 driving a water flow. The water quality purification device includes a component filled with a micro-electrolysis catalyst and a biological filtration component which are sequentially connected in series. The component filled with the micro-electrolysis catalyst includes a container sieve plate 1 and the micro-electrolysis catalyst filled in the sieve plate 1. The biological filtration component is a biochemical wheel 2. A water pump 3 is disposed at an upstream of the water quality purification device.

A water inlet/outlet of the water purifier is connected to a water body in an aquarium and the water purifier is used for purifying the water quality in the aquarium during use. No electrode is disposed in the aquarium. 10 grams of micro-electrolysis catalyst is added into per 30 liters of water. The water body processed by the catalyst is filtered by the biological filtration component and then enters the aquarium for recycling.

The water quality purification device described in this embodiment is used in the aquarium added with 0.8 g/L nitrite and 0.08 g/L phosphate. Meanwhile, a control tank with only the biological filtration component and a circulating water pump is disposed to observe the changes of the nitrite and phosphate over time. After detection, it is found that after 5 days, the nitrite content in the aquarium configured with the water quality purification device drops below 0.04 g/L, and phosphate content drops below 0.016 g/L. Meanwhile, the nitrite content and phosphate content in the control tank basically has not changed.

Embodiment Two

Figure 2:
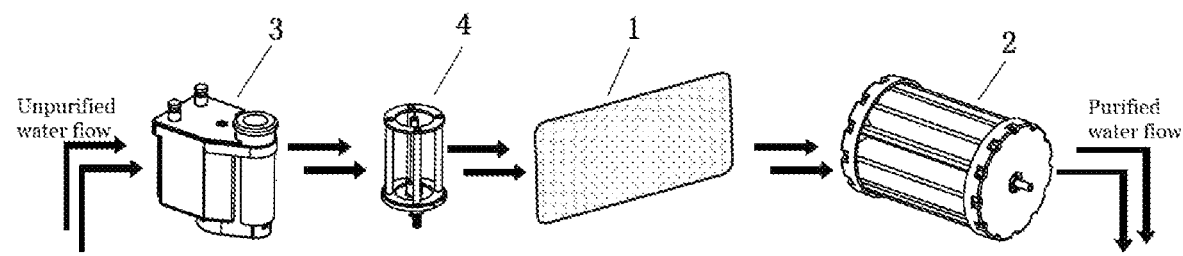
FIG. 2 is a schematic diagram of a water purifier in Embodiment two in accordance with the present disclosure.

This embodiment provides a water purifier. As illustrated in FIG. 2, the water purifier includes a water pump 3 driving a water flow and a water quality purification device which are sequentially connected in series. The water quality purification device includes an electrolysis electrode, a component filled with a micro-electrolysis catalyst and a biological filtration component which are sequentially connected in series. The component filled with the micro-electrolysis catalyst includes a container sieve plate 1 and the micro-electrolysis catalyst filled in the sieve plate 1. The biological filtration component is a biochemical wheel 2.

Figure 3:
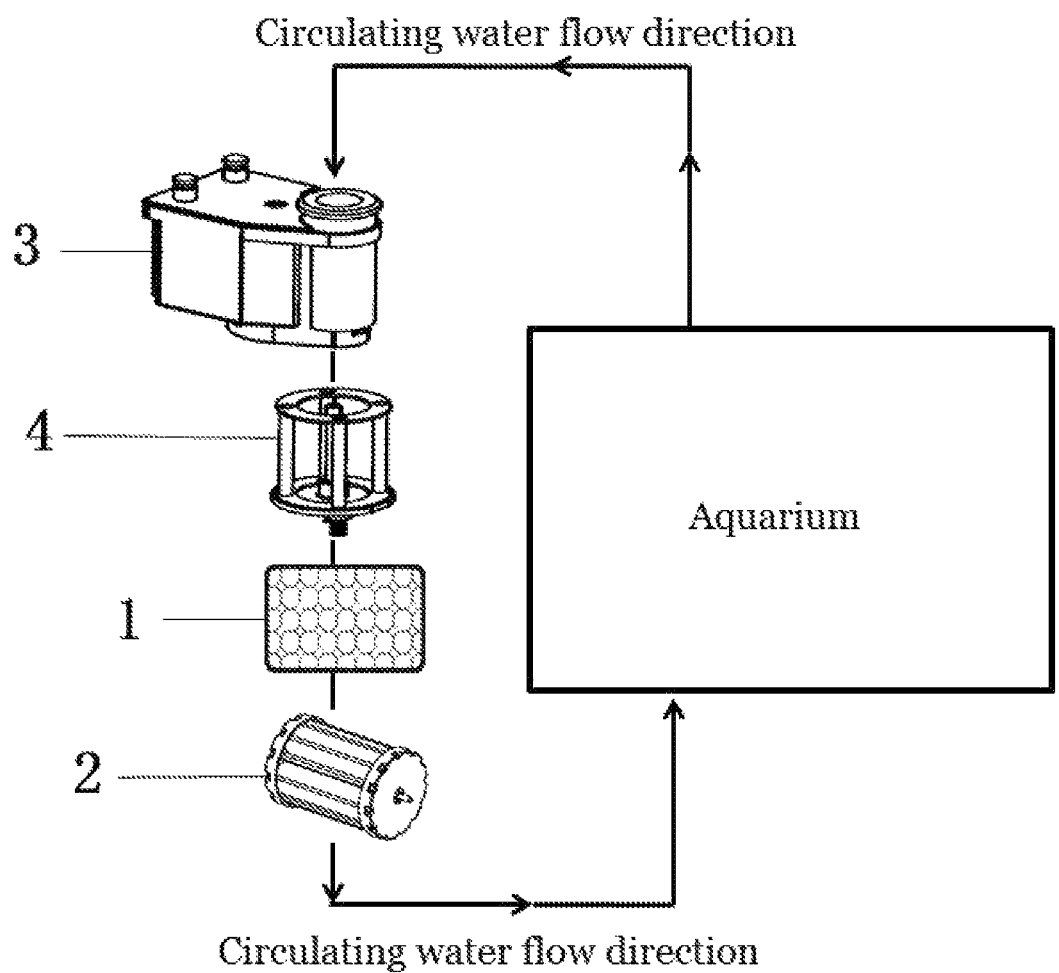
FIG. 3 is a use diagram of the water purifier in Embodiment two in accordance with the present disclosure.

A water inlet/outlet of the water purifier is connected to a water body in an aquarium during use. As illustrated in FIG. 3, 10 grams of micro-electrolysis catalyst are added into per 30 liters of water. The water body processed by the catalyst is filtered by the biological filtration component and then enters the aquarium for recycling.

The water quality purification device described in this embodiment is used in the aquarium added with 0.8 g/L nitrite and 0.08 g/L phosphate. Meanwhile, a control tank with only the biological filtration component and a circulating water pump is disposed to observe the changes of the nitrite and phosphate over time. After detection, it is found that after 3 days, the nitrite content in the aquarium configured with the water quality purification device drops below 0.04 g/L, and phosphate content drops below 0.016 g/L. Meanwhile, the nitrite content and phosphate content in the control tank basically has not changed.

Embodiment Three

This embodiment provides a water quality purification device. The water quality purification device includes a component filled with a micro-electrolysis catalyst and a biological filtration component which are sequentially connected in series. The component filled with the micro-electrolysis catalyst includes a container and the micro-electrolysis catalyst filled in the container. The biological filtration component is biochemical cotton.

A water inlet/outlet of the water quality purification device is connected to a water body of an aquarium and is applied to purify the water quality in the aquarium during use. No electrode is disposed in the aquarium. 20 grams of micro-electrolysis catalyst are added into per 30 liters of water. The water body processed by the catalyst is filtered by the biological filtration component and then enters the aquarium for recycling.

For the purification methods of the water quality purification device and the configuration of the control group in this embodiment, referring to the Embodiment one. After detection, it is found that after 3 days, the nitrite content in the aquarium configured with the component filled with the micro-electrolysis catalyst and the biological filtration component drops below 0.04 g/L, and phosphate content drops below 0.016 g/L. Meanwhile, the nitrite content and phosphate content in the control tank basically has not changed.

Embodiment Four

This embodiment provides a water quality purification device. The water quality purification device includes a component filled with a micro-electrolysis catalyst and a biological filtration component which are sequentially connected in series. The component filled with the micro-electrolysis catalyst includes a filter cake and the micro-electrolysis catalyst filled in the filter cake. The biological filtration component is ceramic packing.

A water inlet/outlet of the water quality purification device is connected to a water body of an aquarium and is applied to purify the water quality in the aquarium during use. No electrode is disposed in the aquarium. 30 grams of micro-electrolysis catalyst are added into per 30 liters of water. The water body processed by the catalyst is filtered by the biological filtration component and then enters the aquarium for recycling.

The purification methods of the water quality purification device and the configuration of the control group in this embodiment refer to the Embodiment one. After detection, it is found that after 4 days, the nitrite content in the aquarium configured with the component filled with the micro-electrolysis catalyst and the biological filtration component drops below 0.3 g/L, and phosphate content drops below 0.016 g/L. Meanwhile, the nitrite content and phosphate content in the control tank basically has not changed.

Comparative Example One

This comparative example provides a water purifier and a use thereof. A water quality purification device in the water purifier merely includes a component filled with a micro-electrolysis catalyst. The structure of the component filled with the micro-electrolysis catalyst is the same as that of the component filled with the micro-electrolysis catalyst in the Embodiment one.

A water inlet/outlet of the water purifier is connected to a water body of an aquarium and is applied to purify the water quality in the aquarium during use. The purification manner and the configuration of the control group refer to the embodiment one.

Since the water quality purification device does not include a biological filtration component in this embodiment, after detection, it is found that significant amount of iron phosphate precipitates appear in the water tank, meanwhile, the concentration of nitrate in the water is not reduced.

Comparative Example Two

This comparative example provides a water purifier and a use thereof. A water quality purification device in the water purifier merely includes a biological filtration component, and does not include a component filled with a micro-electrolysis catalyst. The structure of the biological filtration component is the same as that of the biological filtration component in the Embodiment one.

A water inlet/outlet of the water purifier is connected to a water body of an aquarium and is applied to purify the water quality in the aquarium during use. The purification manner and the configuration of the control group refer to the Embodiment one.

Since the water quality purification device does not include the component filled with the micro-electrolysis catalyst in this embodiment, after detection, it is found that the water quality in the water tank and the control group have no difference within 3 days.

It can be seen from the above embodiments and comparative examples that the present disclosure enables rapid degradation and high-efficiency purification of pollutants in the polluted water body by combining the micro-electrolysis catalyst with the biological filtration component, so that various indicators of the water quality meet the cultivation standards for freshwater/seawater fish and molluscs.

Applicants declare that the present disclosure describes detailed process device and process flow of the present disclosure through the embodiments, but the present disclosure is not limited to the detailed process device and process flow described above, that is, the present disclosure should not be implemented by relying on the detailed process device and process flow described above. Those skilled in the art should understand that any improvements of the present disclosure, equivalent replacements of various raw materials of the product of the disclosure, additions of the auxiliary component and selections of the specific method are within the scope of protection of the present disclosure.

What claimed is:

1. A water quality purification device, comprising a component filled with a micro-electrolysis catalyst, and a biological filtration component, which are sequentially connected in series;
   the component filled with the micro-electrolysis catalyst comprises a container and the micro-electrolysis catalyst filled in the container;
   wherein the container is a support structure having openings and being operative to fix catalyst particles; and
   the water quality purification device further comprises an electrolysis electrode disposed at an upstream of the component filled with the micro-electrolysis catalyst, wherein the electrolysis electrode is configured to assist micro-electrolysis of the micro-electrolysis catalyst, thereby improving the water purification effect.

2. The water quality purification device according to claim 1, wherein there are an aerobic zone and an anaerobic zone which are interconnected in the biological filtration component.

3. The water quality purification device according to claim 1, wherein the biological filtration component comprises at least one of: a biochemical wheel, a biochemical cotton, a biochemical ball, a quartz ball, an activated carbon, or a ceramic packing.

4. The water quality purification device according to claim 1, wherein the water quality purification device further comprises a transfer pump for driving the circulation of a water body, the transfer pump being disposed on a water flow path of the water quality purification device.

5. A water purifier used in an aquarium, wherein an inside of the water purifier comprises a water quality purification device;
   a component filled with a micro-electrolysis catalyst comprises a container and the micro-electrolysis catalyst filled in the container;
   wherein the container is a support structure having openings and being operative to fix catalyst particles; and
   the water quality purification device further comprises an electrolysis electrode disposed at an upstream of the component filled with the micro-electrolysis catalyst, wherein the electrolysis electrode is configured to assist micro-electrolysis of the micro-electrolysis catalyst, thereby improving the water purification effect.

6. The water purifier according to claim 5, further comprising a transfer pump configured for driving the circulation of a water body in the aquarium, the transfer pump being disposed at an upstream and/or a downstream of a water flow path of the water quality purification device.

7. The water purifier according to claim 5, wherein there are an aerobic zone and an anaerobic zone which are interconnected in the biological filtration component.

8. The water purifier according to claim 5, wherein the biological filtration component comprises at least one of: a biochemical wheel, a biochemical cotton, a biochemical ball, a quartz ball, an activated carbon, or a ceramic packing.

9. An aquarium, comprising a water quality purification device which comprises a component filled with a microelectrolysis catalyst, and a biological filtration component, which are sequentially connected in series;

the component filled with the micro-electrolysis catalyst comprises a container and the micro-electrolysis catalyst filled in the container;

wherein the container is a support structure having openings and being operative to fix catalyst particles; and the water quality purification device further comprises an electrolysis electrode disposed at an upstream of the component filled with the micro-electrolysis catalyst, wherein the electrolysis electrode is configured to assist micro-electrolysis of the micro-electrolysis catalyst, thereby improving the water purification effect.

10. The aquarium according to claim 9, wherein there are an aerobic zone and an anaerobic zone which are interconnected in the biological filtration component.

11. The aquarium according to claim 9, wherein the biological filtration component comprises at least one of: a biochemical wheel, a biochemical cotton, a biochemical ball, a quartz ball, an activated carbon, or a ceramic packing.

* * * * *